No. 623,223. Patented Apr. 18, 1899.
W. STEIN.
ELECTRIC RAILWAY SYSTEM.
(Application filed Oct. 3, 1898.)
(No Model.)
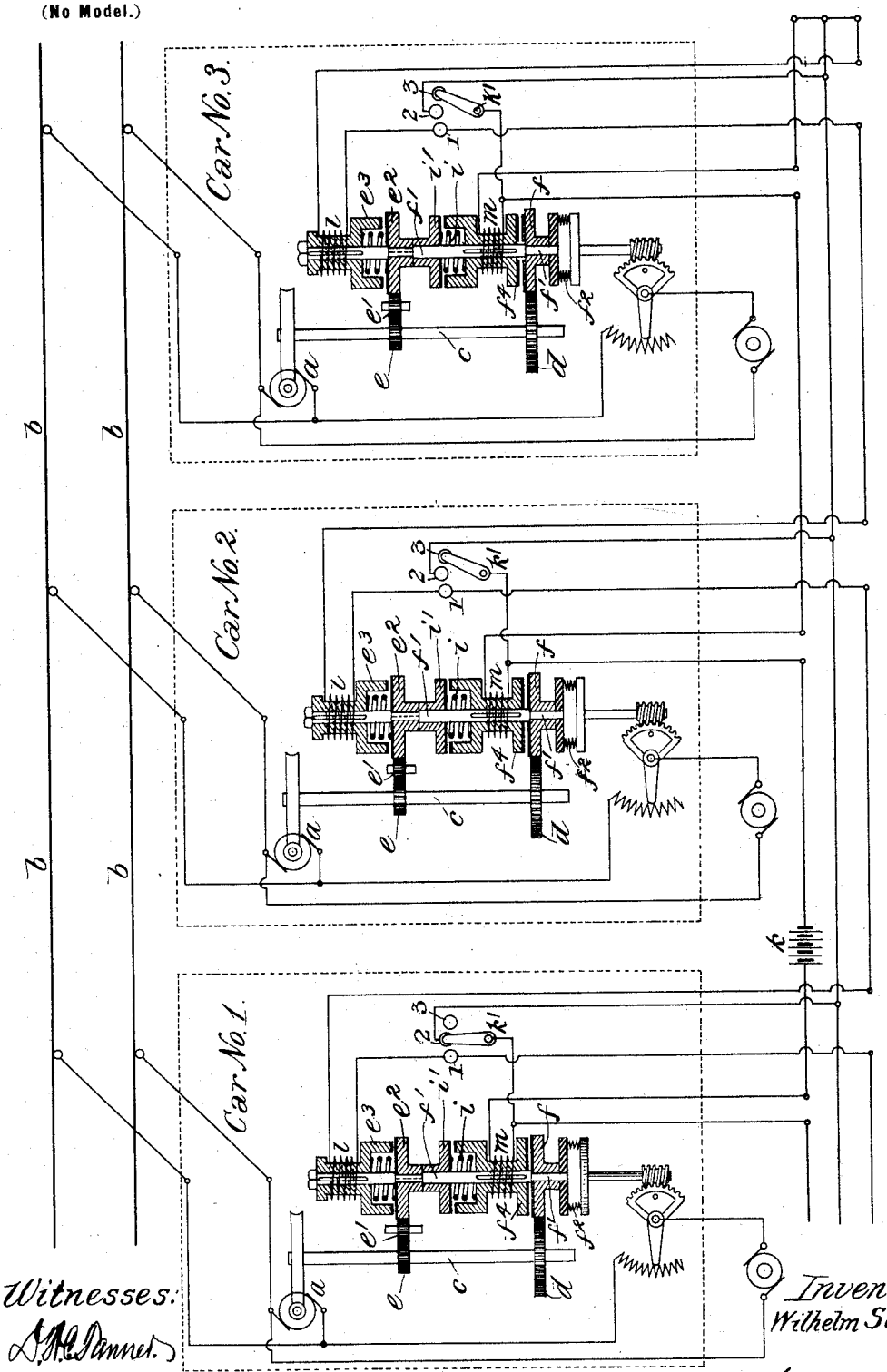
Witnesses.
Inventor,
Wilhelm Stein,
By Barton Bros Attorneys

UNITED STATES PATENT OFFICE.

WILHELM STEIN, OF HAMBURG, GERMANY, ASSIGNOR TO THE SIEMENS & HALSKE ELECTRIC COMPANY OF AMERICA, OF CHICAGO, ILLINOIS.

ELECTRIC-RAILWAY SYSTEM.

SPECIFICATION forming part of Letters Patent No. 623,223, dated April 18, 1899.

Application filed October 3, 1898. Serial No. 692,540. (No model.)

*To all whom it may concern:*

Be it known that I, WILHELM STEIN, a subject of the Emperor of Germany, residing at Hamburg, Germany, have invented a certain new and useful Improvement in Electric-Railway Systems, (Case No. 169,) of which the following is a full, clear, concise, and exact description.

My invention relates to electric-railway systems, and more particularly to systems of this class wherein a plurality of motor-cars are provided in each train, the object of the invention being to enable one motorman to operate the controllers upon all of the motor-cars in an improved manner.

Generally speaking, the invention may be said to consist in a motor upon each car, a controller operated by each motor, and means controlled by the motorman for regulating the operation of the controllers by the motors for the purpose of starting and stopping the train. The controller-actuated motors run synchronously, by which I mean that the speeds of the motors are such that the same change is effected in the operative condition of the controllers by the motors in a given period of time. The motors, however, are preferably of the same size and are caused to run at the same speed, in which case the controllers are preferably similar, as are the different mechanisms operated by the motors for actuating the controllers.

In the preferred embodiment of the invention the motors are preferably continuously rotated, intermediate or clutch mechanism being interposed between each motor and controller for operating the latter. The motorman is provided with means for changing the operative relation between the intermediate mechanism and the motor, whereby the controller may be actuated to start and stop the train.

In one embodiment of my invention I have provided a clutch mechanism interposed between the motor and the controller to be operated, this clutch mechanism being preferably adjusted to produce the desired operation of the controller by means of electromagnets whose circuits are controlled by a switch in charge of the motorman.

I will explain my invention more particularly by reference to the accompanying drawing, which illustrates the preferred embodiment thereof.

In the drawing I have illustrated a train of three motor-cars whose traction-motors are supplied with current in any suitable manner. Upon each car I preferably provide a motor $a$ in addition to the traction-motor, which preferably receives current from the trolley-wires $b\ b$ by means of the trolleys in contact therewith. These motors are of the same size and are adjusted to rotate at the same speed. The motors drive the shafts $c$ at a uniform rate of speed. A large gear-wheel $d$ and a small gear-wheel $e$ are provided upon each shaft $c$. Each gear-wheel $d$ engages a collar $f$, preferably of non-magnetic material, loosely mounted upon a shaft $f'$. A flexible coupling $f^2$ unites the shaft $f'$ with the shaft of the controller to permit the controller-shaft gradually to start from a state of rest. Each wheel $e$ engages a small wheel $e'$, which in turn rotates a clutch member $e^2$, also loosely mounted upon the shaft $f'$. Each clutch member $f$ is opposed to a clutch member $f^4$. Each clutch member $e^2$ is associated with a clutch member $e^3$. The clutch members $e^3$ and $f^4$ are splined upon the shaft $f'$ and are capable of longitudinal movement upon the shaft. A coiled spring is interposed between the clutch members $e^2\ e^3$ normally to separate the same. Another coiled spring $i$ is interposed between the member $f^4$ and a disk armature $i'$, preferably mounted upon the shaft $f'$ and having no longitudinal movement thereupon. The latter coiled spring when not counteracted maintains the clutch members $f\ f^4$ in engagement. The coils $l\ m$ of the clutch members $e^3\ f^4$ are adapted to be included in circuit with the battery $k$ by the switch $k'$, operated by the motorman.

The controller-operating mechanisms upon the cars are similar, and similar letters and numerals of reference have been employed to designate like parts in these mechanisms.

In operating the controller only one switch $k'$ is employed, the switches upon the other cars being open. The operation may be generally described as follows: To start the train, the switch $k'$ upon car No. 1 is engaged in contact with contact-button 1, circuit from battery $k$ being thereby closed through the coils $l\ m$, whereby the clutch members $e^2\ e^3$ upon each car are engaged and each clutch member $f^4$ attracted toward its armature $i'$ to disengage it from its companion member $f$. Each controller is thereupon slowly operated by the wheels $e$ and $e'$ to cut the car-motors into circuit. When the train has reached the desired speed or when it is stationary, the switch $k'$ is thrown upon button 2, circuit through coils $l$ being thereby opened, current from battery $k$ continuing to flow through coils $m$. Upon this operation of the switch the clutch members $e^2\ e^3$ upon each car are separated, so that no motion is communicated from the shafts $c$ to the shafts $f'$, the parts $e^2 f$ being the only ones upon the shafts $f$ that are constantly rotated.

When it is desired to cut the car-motors out of circuit, the switch $k'$ is moved to button 3 to open circuit through the coils $m$, the spring $i$ thereupon throwing the clutch members $f f^4$ of each clutch into engagement, the wheels $d$ then serving to rotate the shafts $f'$ at a rapid speed to cut the car-motors out of circuit. After the train has been brought to a stop the switch $k'$ is again thrown upon button 2, current from battery $k$ being again directed through the coils $m$ to separate the members $f f^4$ upon each car.

The switch $k'$ constitutes a unitary means for controlling all of the electromagnetic means controlling the engagement between the controllers and their motors.

In some of the claims I speak of a "constantly-running motor" in the sense that the motor is at the desired speed before it is employed to effect the desired change in the working condition of the controller.

I have herein illustrated the preferred form of my invention. It is obvious, however, that other embodiments of the invention may be made without departing from its spirit, and I do not therefore desire to be limited to the precise construction shown; but, Having described my invention, I claim as new and desire to secure by Letters Patent—

1. In an electric-railway system, the combination with a plurality of motor-cars in a single train; of controllers for the traction-motors, one upon each of said cars; a constantly-running motor upon each of said cars, and means for engaging the motors with and disengaging them from the controllers, substantially as described.

2. In an electric-railway system, the combination with a plurality of motor-cars in a single train; of controllers for the traction-motors, one upon each of said cars; a plurality of constantly and synchronously running motors, one upon each car, and means for simultaneously engaging the motors with and disengaging them from the controllers, substantially as described.

3. In an electric-railway system, the combination with a plurality of motor-cars in a single train; of controllers for the traction-motors, one upon each of said cars; a plurality of constantly and synchronously running motors, one upon each car; means for simultaneously engaging the motors with and disengaging them from the controller, and means upon a car of the train for governing the operation of the aforesaid means, substantially as described.

4. The combination with a plurality of controllers; of a plurality of constantly-running motors, each controller being associated with a motor, and means for simultaneously engaging the motors with and disengaging them from the controllers, substantially as described.

5. The combination with a plurality of controllers; of a plurality of constantly and synchronously running motors, each controller being associated with a motor, and means for simultaneously effecting operative connections between the motors and controllers, substantially as described.

6. In an electric-railway system, the combination with a plurality of motor-cars; of a plurality of controllers, one upon each motor-car; a plurality of constantly and synchronously running motors, each controller being associated with a motor; mechanism interposed between each motor and its associated controller for operating the latter in one direction; additional mechanism also interposed between each motor and its associated controller for operating the same in the reverse direction, and means for operatively connecting one or the other of the aforesaid mechanisms between each motor and controller and for disconnecting each motor from the controller associated therewith, substantially as described.

7. In an electric-railway system, the combination with a plurality of motor-cars; of a plurality of controllers, one upon each motor-car; a plurality of constantly and synchronously running motors, each controller being associated with a motor; mechanism interposed between each motor and its associated controller for operating the latter in one direction; additional mechanism also interposed between each motor and its associated controller for operating the same in the reverse direction; and means for operatively connecting one or the other of the aforesaid mechanisms between each motor and controller and for disconnecting each motor from the controller associated therewith, substantially as described.

8. In an electric-railway system, the combination with a plurality of motor-cars; of a plurality of controllers, one upon each motor-car; a plurality of constantly and synchronously running motors, each controller being associated with a motor; mechanism interposed between each motor and its associated controller for operating the latter in one direction; additional mechanism also interposed between each motor and its associated controller for operating the same in the reverse direction; and electromagnetic means for controlling the operation of the aforesaid mechanisms, whereby the controllers are simultaneously operated, substantially as described.

9. In a system of electric railway, the combination with a plurality of motor-cars, each having a controller; of constantly and synchronously running motors, one associated with each controller; means interposed between each motor and controller for simultaneously connecting the motors with their controllers and for disconnecting the motors and controllers, whereby the controllers are simultaneously operated, and means upon one of the cars of the train for governing the last aforesaid means, substantially as described.

10. The combination with a motor, of a shaft $c$ rotated thereby, wheels $e$ and $d$ upon said shaft, the wheel $d$ being of greater diameter than the wheel $e$, a third wheel $e'$ engaging the wheel $e$, a shaft $f'$ connected with a controller, clutch members $e^2 f$ loosely mounted upon said shaft and rotated by the wheels $d$ and $e'$, clutch members $e^3$ and $f^4$ keyed or splined upon the shaft $f'$ and adapted to have longitudinal movement thereupon, coils for energizing the clutch members $e^3 f^4$ to actuate said clutch members in one direction, and means for actuating said clutch members in a reverse direction, substantially as described.

11. In an electric-railway system, the combination with a plurality of motor-cars in a single train; of controllers upon the cars for the traction-motors, a plurality of motors for operating said controllers in reverse directions, each motor being associated with a controller, and electromagnetic means for governing the operative engagement of the last aforesaid motors with the controllers, substantially as described.

12. The combination with a plurality of controllers; of a plurality of motors, each motor being associated with a controller and serving to operate the same in reverse directions; electromagnetic means associated with each controller for governing the operative engagement of the motors with the controllers, and unitary means for governing the operation of all of said electromagnetic means, substantially as described.

13. In an electric-railway system, the combination with a plurality of motor-cars; of a plurality of controllers, one upon each motor-car; a plurality of constantly and synchronously running motors, each controller being associated with a motor; mechanism interposed between each motor and its associated controller for operating the latter in one direction; additional mechanism also interposed between each motor and its associated controller for operating the same in the reverse direction, and electromagnetic means for controlling said mechanisms, substantially as described.

In witness whereof I hereunto subscribe my name this 6th day of September, A. D. 1898.

WILHELM STEIN.

Witnesses:
E. H. L. NUMMENHOFF,
W. P. LEONHARD.